(12) United States Patent  
Otte et al.

(10) Patent No.: US 12,130,161 B2  
(45) Date of Patent: Oct. 29, 2024

(54) FLOW TUBE FOR A FLOW SENSOR AND PROCESS FOR MANUFACTURING A FLOW TUBE

(71) Applicant: Drägerwerk AG & Co. KGaA, Lübeck (DE)

(72) Inventors: Tobias Otte, Lübeck (DE); Helena Kaszás, Groß Grönau (DE); Ralph-Peter Jacobi, Reinbek (DE); Philipp Schütze, Lübeck (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 1146 days.

(21) Appl. No.: 16/960,809

(22) PCT Filed: Jan. 8, 2019

(86) PCT No.: PCT/EP2019/050300  
§ 371 (c)(1),  
(2) Date: Jul. 8, 2020

(87) PCT Pub. No.: WO2019/137893  
PCT Pub. Date: Jul. 18, 2019

(65) Prior Publication Data  
US 2021/0003432 A1 Jan. 7, 2021

(30) Foreign Application Priority Data  
Jan. 9, 2018 (DE) .......................... 102018000084.3

(51) Int. Cl.  
*G01F 1/42* (2006.01)  
*B23K 26/073* (2006.01)  
(Continued)

(52) U.S. Cl.  
CPC ............ *G01F 1/42* (2013.01); *B23K 26/0734* (2013.01); *B23K 26/57* (2015.10); *F16L 47/02* (2013.01); *G01F 15/14* (2013.01)

(58) Field of Classification Search  
CPC ........................................... G01F 1/42  
See application file for complete search history.

(56) References Cited

U.S. PATENT DOCUMENTS 4,083,245 A 4/1978 Osborn  
6,585,662 B1 7/2003 Jones et al.  
(Continued)

FOREIGN PATENT DOCUMENTS

CH 701755 A1 3/2011  
CN 102131631 A 7/2011  
(Continued)

OTHER PUBLICATIONS

Machine translation of DE102010040287 (Year: 2011).*  
(Continued)

*Primary Examiner* — Walter L Lindsay, Jr.  
*Assistant Examiner* — Andrew V Do  
(74) *Attorney, Agent, or Firm* — McGlew and Tuttle, P.C.

(57) ABSTRACT

A flow tube (10) has a housing (12, 14) including at least a first housing half (12) and a second housing half (14). Each housing half (12, 14) has a connection surface (20, 22) intended for combination with the other housing half (12, 14). The connection surfaces (20, 22) enclose a mounting gap (30) for an orifice element (16). Outside of the mounting gap (30) the connection surfaces (20, 22) butt against each other in some sections by respective abutting surface portions (32, 34), and outside of the mounting gap (30) and outside of the abutting surface portions (32, 34) the housing halves (12, 14) are integrally combined with each other. A (Continued)

method is provided for producing the flow tube, namely for integrally joining the housing halves (12, 14).

20 Claims, 3 Drawing Sheets

(51) Int. Cl.
*B23K 26/57* (2014.01)
*F16L 47/02* (2006.01)
*G01F 15/14* (2006.01)

(56) References Cited

U.S. PATENT DOCUMENTS

| | | | |
|---|---|---|---|
| 2010/0198155 A1* | 8/2010 | Moy | G01F 15/14 604/118 |
| 2011/0146903 A1 | 6/2011 | Stauffer et al. | |
| 2011/0315905 A1 | 12/2011 | Hirose et al. | |
| 2017/0037987 A1 | 2/2017 | Dohi et al. | |
| 2018/0216771 A1 | 8/2018 | Kallweit et al. | |

FOREIGN PATENT DOCUMENTS

| | | |
|---|---|---|
| CN | 102265043 A | 11/2011 |
| CN | 105814410 A | 7/2016 |
| DE | 10 2010 040 287 A1 | 3/2011 |
| DE | 102015112424 A1 | 2/2017 |
| EP | 0 331 773 A1 | 9/1989 |

OTHER PUBLICATIONS

Anonymous, "Plastic Welding with Diode Lasers" Jun. 1, 2005 (Jun. 1, 2005). Retrieved from the Internet: http://www.designforlasermanufacture.com/assets/LaserLine_0506-Distributors-PlasticWelding.pdf.
Steffen Reinl, "Radial Welding of Polymer Parts under Closed Loop Process Control" Laser Technik Journal, Jan. 1, 2015 (Jan. 1, 2015), pp. 46-50. Retrieved from the Internet: http://www.dilas.com.cn/assets/media/mediacoverage/DILAS_Radial_Welding_of_Polymer_Parts_LTJ-June2015.pdf.
Andreas Roesner, et al., "Laserdurchstrahlschweißen von Thermopalsten", Sep. 2008, pp. 28-32.

* cited by examiner

FLOW TUBE FOR A FLOW SENSOR AND PROCESS FOR MANUFACTURING A FLOW TUBE

CROSS REFERENCE TO RELATED APPLICATIONS

This application is a United States National Phase Application of International Application PCT/EP2019/050300, filed Jan. 8, 2019, and claims the benefit of priority under 35 U.S.C. § 119 of German Application 102018000084.3, filed Jan. 9, 2018, the entire contents of which are incorporated herein by reference.

TECHNICAL FIELD

The present invention pertains to a flow tube, especially a flow tube, which is considered to be a key component of a flow sensor, to a flow sensor with such a flow tube as well as to a process for manufacturing a flow tube.

TECHNICAL BACKGROUND

Flow sensors and flow tubes comprised thereby are basically known per se, for example, from U.S. Pat. No. 4,083,245, DE 10 2010 040 287 A1 or EP 0 331 773 A1.

Flow sensors are used in medical engineering, for example, for the control and/or regulation of ventilators to measure and/or control a patient flow. It is advantageous in some applications if the flow sensors are mounted directly behind a so-called patient tube and filter. For this case, the sensors have to be able to measure the flow in both directions (bidirectionally), especially from the ventilator to the patient and vice versa.

In the prior-art flow sensors of the type mentioned in the introduction, a flow body is arranged as a resistance in a flow duct defined by the flow tube. The flow body is designated below as a diaphragm element corresponding to the usual terminology. The diaphragm element causes a drop in pressure in case of a flow through the flow tube. This drop in pressure caused by the diaphragm element is measured and the measured drop in pressure is an indicator of the respective flow through the flow tube.

Standard requirements determine that exhalation resistance and inhalation resistance for the patient (designated below as resistance) may not exceed a defined value depending on the application. For this reason, the diaphragm element must be configured such that a specific differential pressure is not exceeded in case of a defined flow. The actual differential pressure sensor shall be considered to be another boundary condition. This differential pressure sensor has a specific measuring range in the inspiratory and expiratory directions, so that the diaphragm element has to be configured such that the maximum measurable differential pressure is not exceeded in case of the maximum flow to be measured. The differential pressure is usually digitized by means of an A/D converter to process measured values and is converted into a measured flow value by means of a lookup table stored in the ventilator. Since a good determination of the flow is necessary for controlling a ventilator, especially in case of low flows, the diaphragm element must be correspondingly configured such that a sufficient increase in the sensor-characteristic qualities (characteristic) is present between the flow and the differential pressure (flow-dp).

A nonlinear characteristic results in case of a circular diaphragm as resistance. This makes it very difficult to reach both a higher resolution in the low-flow area as well as to meet the standard requirements with regard to the resistance. It is more advantageous and state of the art to embody sensors with a linear characteristic, which sensors frequently consist of a variable opening between two halves of a housing of the sensor as well as a housing with a special internal geometry, which causes a desired flow topology. The variable opening is embodied by means of a flap functioning as a diaphragm element. The flap opens to a correspondingly greater extent as the flow becomes greater, so that the drop in pressure drops proportionally. Pressure measurement points are arranged in front of and behind the flap sufficiently spaced apart (as a function of flow topology) in order to be able to measure a static pressure that is as stationary as possible.

The flap of the sensor is usually made of steel or plastic, for example, Mylar (EP 0 331 773 A1) and the housing is made of a suitable plastic depending on the application (disposable or recyclable). The drop in pressure caused by the diaphragm element and the resulting differential pressure are largely determined by the size of the passage opening in the case of the particular flow rate. The size of the passage opening is in turn determined per se by the opening characteristic of the flap as well as by the size of the flap. The opening characteristic of the flap is largely determined by the force exerted by the incoming gas on the flap, the material properties of the flap, the flap contour and the mounting of the flap. The force acting on the flap depends on the incoming flow properties of the gas, among other things, which in turn depend on the internal geometry of the housing halves, but also on the density of the particular gas, among other things.

It is advantageous in a bidirectional sensor if the characteristic is identical in both directions. A practical configuration of such a sensor is described in EP 0 331 773 A1 and it is mentioned, among other things, that a tension-free mounting of the flap in the respective housing is assumed.

All influencing variables taken together yield the component tolerance of the sensor (series dispersion) and determine a resulting sensor-specific measuring accuracy. A high measuring accuracy is always desirable and, for example, especially advantageous if no calibration can be carried out by the user before use (for example, in emergency situations in rescue service).

The series-related dispersion of the characteristic and hence the measuring accuracy of the flow sensor are influenced to a great extent by the reproducibility of the opening characteristic of the particular flap (flap opening characteristic). This dispersion is—as explained above—dependent, among other things, on the mounting of the flap between the housing halves of the sensor. The more reproducible the mounting can be configured, the more reproducible is also the opening characteristic of the flap. The mounting of the flap on pins, which are arranged in a housing half, is described in EP 0 331 773 A1. If the second housing half is now joined, the flap is either clamped or lies loosely in a mounting gap depending on the shaping of the gap geometry in the housing halves. The clamping force depends on the thickness tolerances of the flap material and the width of the mounting gap. The width of the mounting gap depends on the production tolerances of the joining process as well as on the tolerances of the housing halves.

Tensions that influence the opening characteristic are introduced into the flap material in case of the clamping of the flap. How intensely tensions in the material are formed due to the clamping is primarily determined by the mechanical stability of the flap material and by the shape of the housing halves, with which the flap material is clamped. Flaps made of a stiffer material can for this reason be clamped better.

In case of a loose mounting, the opening characteristic of the flap is determined by the flap material thickness in relation to the geometry of the mounting gap (the mounting gap geometry). The flap material can move in the mounting gap as a function of the degree of opening of the flap. When the flow is against the flap, it is pressed against a downstream (located downstream) mounting surface of the mounting gap and downstream of the housing half Due to the opening of the flap, the material bends in the mounting gap in the direction toward the other housing half, for example, as a function of the manner of the mounting until it is in contact with the upstream (located upstream) mounting surface of the mounting gap and upstream of the housing half. The flap is then in contact with the housing half downstream only on the inner edge of the mounting gap. This relative motion in the mounting gap that is possible in case of a loose mounting means that the flap can open further than in the clamped state. If the mounting gap is now changed, for example, depending on the batch, sensors with different characteristic curves are obtained.

Furthermore, joining the two plastic housing halves, for example, by ultrasound welding is known in the state of the art (DE 10 2010 040 287 A1). However, ultrasound welding has the drawback that for joining, a path must be traveled with one of the two housing halves in order to plasticize the energy director thereof and to weld together with the other, fixed housing half Consequently, the resulting mounting gap here is dependent on the tolerances of the plastic components and moreover on the travel path accuracy as well as the process control of the energy input during the ultrasound welding. In addition, unavoidable vibrations are introduced into the flap material using this process, which may lead to damage to the material of the diaphragm element. Especially if the flap shall be clamped in a targeted manner, the ultrasound welding process is rather unfavorable due to the points mentioned above, because the clamping force cannot as a result be set in a sufficiently reproducible manner.

SUMMARY

An object of the present invention is to provide a flow tube, especially a flow tube for a flow sensor, which guarantees a reproducible mounting of a diaphragm element between two housing halves of the flow tube. Another object is to provide a process for manufacturing such a flow tube.

In regard to the flow tube, this object is accomplished according to the present invention by means of a flow tube with features as described. The flow tube comprises a first housing half and a second housing half. The two housing halves together form a housing. The housing functions as a flow tube. Each housing half has a connection surface that is intended for combination with the respective other housing half. The connection surfaces of the two housing halves in the combined (joined) with one another state enclose a mounting gap. The mounting gap is intended for receiving a diaphragm element, especially a diaphragm element that functions as a flow body in a flow duct defined by the housing. The connection surfaces of the two housing halves combined with one another abut against one another in some sections outside of the mounting gap each with an abutting surface section. In addition, provisions are made here in case of the flow tube proposed here for the housing halves to be combinable with one another by connection in substance (substance-to-substance connection, material-locking connection or material bonded connection) in a connection in substance area (area for material bonding, area for material locking) outside of the mounting gap and outside of the abutting surface section and to be combined with one another by connection in substance in case of a ready-to-operate flow tube outside of the mounting gap and outside of the abutting surface sections. Combining by connection in substance takes place by laser welding and the two housing halves can be combined with one another by connection in substance by laser welding in the connection in substance area. For this purpose, the two housing halves are made of a material that is suitable for laser welding, especially a plastic suitable for laser welding. One of the two housing halves is laser transparent or at least laser transparent in the connection in substance area and for this purpose is made of a corresponding material, especially entirely or partially made of a laser-transparent plastic. The other housing half is made of a material that absorbs the energy of the laser beam, especially made of such a material in the area of the connection in substance area. The material absorbing the energy of the laser beam is optionally likewise a plastic, especially a plastic with particles introduced into it which bring about the absorption of the energy of the laser beam, for example, soot particles.

The two housing halves are preferably transparent. Transparent here means that a viewer is able to see through the respective housing part or through both housing parts together and is able in this manner to check whether foreign bodies are located in the flow duct and/or hinder the mobility of the diaphragm element in case of a flow tube operating in a medical device, especially a ventilator. Nevertheless, in case of such housing parts that are transparent in this sense, only one of the housing parts is laser transparent, while the other housing part absorbs the energy of the laser beam. Methylmethacrylat-Acrylnitril-Butadien-Styrol (MABS) or Polymethylmetracrylat (PMMA) is a possible material for the transparent and laser-transparent housing part. The housing part that is transparent and absorbs the energy of the laser beam is made, for example, of the same material, wherein an absorber is inserted into the material of the absorbing housing part.

In the case of a flow tube with a projection, especially with a projection in the form of an annular spring, and with a recess, especially with a recess in an annular groove intended for receiving the annular spring, in the connection surfaces of the two housing halves, one of the two housing halves is laser transparent or is at least laser transparent in the area of the projection or of the recess. The laser transparency causes the laser beam directed towards the housing halves during laser welding to penetrate the laser-transparent housing half (or the laser-transparent section thereof) and the other housing half absorbs the energy of the laser beam. The absorption of the laser beam leads to a local plasticization of the material of the respective housing half in a manner basically known per se and finally brings about the connection in substance. Because of the laser transparency of a housing part or a local laser transparency of a housing part, the connection in substance may take place at a point that is within the volume of the joined housing halves.

The two housing halves may also both have a laser-transparent configuration; however, the laser beam must then be focused very precisely on the point to be welded, so that the area is plasticized and a positive-locking bond is obtained. A drawback here is the larger heat-affected zone needed compared to the process using a laser-energy absorber.

A process for manufacturing a flow sensor of the type described here and below is characterized in that the process comprises at least the following steps: The two housing halves are joined in a first step or in a first process phase, namely such that the diaphragm element is enclosed by the two housing halves in the mounting gap, on the one hand, and the two housing halves abut against one another outside of the mounting gap in the area of the abutting surface sections, on the other hand. In a second step or a second process phase, the combining by connection in substance of the housing halves, especially a combining by connection in substance of the housing halves by laser welding, takes place outside of the mounting gap and outside of the abutting surface sections.

The advantage of this solution is that by means of the abutting surfaces abutting against one another a defined width of the mounting gap is guaranteed. The mounting gap can be configured in a manner specific, for example, to a thickness, a stiffness and/or to other characteristic properties of the flap material.

The joining process offered by laser welding is a joining process that is known per se and is well controlled. In contrast, for example, to ultrasound welding, no vibrations are introduced into the material of the diaphragm element or the material of the housing halves and thus disadvantageous material damage is avoided.

By the two housing halves being combined with one another by connection in substance by laser welding outside of the mounting gap and outside of the abutting surface sections and being combined with one another by connection in substance by laser welding outside of the abutting surface sections in a process for manufacturing such a flow tube, it is ensured that the defined width of the mounting gap does not change when generating the connection in substance. As described above, the defined width of the mounting gap guarantees a defined clamping or mounting of the diaphragm element and thus a defined and reproducible opening characteristic of the diaphragm element. This in turn guarantees a reproducible characteristic curve and thus more precise measured values when using the flow tube as a basis for a flow sensor, the measured values of which are generated on the basis of a lookup table based on the characteristic, without special calibration of every single flow sensor.

Advantageous embodiments of the present invention are the subject of the subclaims. References used here refer to the further configuration of the subject of the principal claim by the features of the respective subclaim and they shall not be considered to represent abandonment of the wish to achieve an independent concrete protection for the combinations of features of the referred subclaims. Furthermore, it shall be assumed in respect to an interpretation of the claims as well as of the description in case of a more specific concretization of a feature in a dependent claim that such a limitation is not present in the respective preceding claims as well as in a more general embodiment of the concrete flow tube. Any reference in the description to aspects of dependent claims shall accordingly also expressly imply a description of optional features even without a special reference. Finally, it should be pointed out that the flow tube may also be perfected corresponding to the dependent process claims, for example, such that the flow tube has features, which arise because of the manufacturing, and the manufacturing process may also be perfected corresponding to the dependent device claims, for example, such that the manufacturing process comprises process steps, which lead to one or more respective features of the flow tube during the manufacture of the flow tube, so that in regard to the disclosure, reference is or can always be alternately made to the individual aspects of the present invention (device, process).

In case of an embodiment of the flow tube, one of the housing halves has at least one projection in its connection surface and the other housing half has in its connection surface at least one recess that is intended for receiving the projection. The connection in substance of the housing halves takes place in a contact area of the projection and the recess and the housing halves can be combined with one another by connection in substance by laser welding by means of the projection and the recess and are combined with one another by connection in substance by laser welding by means of the projection and the recess in case of a ready-to-operate flow tube. A contact area or a contact surface of such a projection arising on the connection surface of one of the housing halves and of a recess in the connection surface of the other housing half, which recess is intended for receiving the projection, functions as a connection in substance area. The location of the connection in substance area guarantees a sufficient distance of the location of the generation of the connection in substance, namely a sufficient distance in space of the area of the local temperature increase in the material of the housing halves resulting during the laser welding, from the mounting gap and from the abutting surface sections. Such a distance in space guarantees that the defined width of the mounting gap does not change during the laser welding and during the generation of the connection in substance caused thereby.

In another embodiment of the flow tube, the mounting gap, the abutting surface sections as well as the projection and recess are arranged on the connection surfaces in the radial direction such that the mounting gap is located in front of the abutting surface sections (i.e., further "inside") in relation to the abutting surface sections, and the projection and the recess are located behind the abutting surface sections (i.e., further "outside") in relation to the abutting surface sections. This sequence, mounting gap: inside; abutting surface sections: center; projection and recess: outside, guarantees the greatest possible distance of the projection and of the recess from the mounting gap and thus the greatest possible distance from the location of the generation of the connection in substance of the housing halves from the mounting gap. Such a distance in space guarantees, in particular, that the defined width of the mounting gap does not change during the generation of the connection in substance.

In case of yet another embodiment of the flow tube, the projection and the recess are connected to one another by connection in substance in the area of a radially outermost common contact surface. This connection point guarantees an even greater distance in space between the location of the generation of the connection in substance of the housing halves and the mounting gap.

In an advantageous embodiment of the flow tube, one of the housing halves has a radially extending recess (annular groove) and the other housing half has a radially extending projection (annular spring) that can be inserted into the radially extending recess. Such a pairing of the annular groove and the annular spring guarantees a very precise fixing of the two housing halves to one another. A connection in substance of the annular groove and the annular spring brings about a radially extending connection in substance and a gastightness of the connection. The connection of the two housing halves for fixing the diaphragm element thus at the same time brings about a connection of the housing halves to a gastight flow tube.

In a preferred embodiment of the flow tube, the two housing halves are connected in substance by laser welding in the area of a radially outermost common contact surface of the annular groove and annular spring. Due to the laser welding in the area of such a radially outermost contact surface that functions as the connection in substance area, the location of the local temperature increase in the material of the housing halves resulting during the laser welding is at a distance especially far from the mounting gap in the radial direction and the material of the annular spring is still between the mounting gap and the connection in substance area in the radial direction, so that it is guaranteed with even more certainty that the defined width of the mounting gap is not changed during the laser welding and during the generation of the connection in substance caused thereby.

In another embodiment of the flow tube intended for the connection in substance by means of the joining process offered by laser welding, the two housing halves are connected in substance by means of a laser beam which is expanded onto a circle and at the same time is active along the entire perimeter of the housing halves of the flow tube. In case of a process for manufacturing such a flow tube, the laser beam intended for laser welding is expanded in a cone envelope by means of an optical device and the resulting, expanded laser beam, designated below briefly as a bundle of beams, is deflected by means of another optical device, especially by means of a ring mirror, in the direction towards the loosely joined housing halves, wherein the projection is connected in substance to the recess at the same time along the entire perimeter in housing halves with a radially extending projection and with a recess intended for receiving the projection there. In case of a ring mirror, the beams of the bundle of beams are deflected by means of the ring mirror with a surface sloped against a plane of the ring mirror in the direction toward a perimeter of a flow tube housing placed in the center of the ring mirror and the housing halves thereof. The simultaneous connection along the entire perimeter of the housing halves, especially the perimeter of the extending projection and the extending recess, i.e., for example, the annular spring and the annular groove, guarantees a similar heating along this perimeter and thus avoids otherwise possible mechanical stresses in the housing halves themselves and between the housing halves.

In an embodiment of the process according to the present invention, in case of a flow tube, whose housing halves have a projection and a recess for receiving the projection, the process step of the joining of the two housing halves comprises the partial step of the insertion of the projection into the recess. Correspondingly, the joining of the two housing halves takes place such that the diaphragm element is enclosed by the two housing halves in the mounting gap, the two housing halves abut against one another outside of the mounting gap in the area of the abutting surface sections and the projection meshes with the recess. In case of such a process, provisions are preferably, but, in principle, optionally made for the two housing halves to be combined with one another by connection in substance of the projection meshing with the recess in the recess.

The joining process offered by laser welding is provided for the connection in substance of the two housing halves or parts of the housing halves, especially of the projection and of the recess, for example, a projection in the form of an annular spring and a recess in the form of an annular groove. In a special embodiment of the process for manufacturing the flow tube of the type described here and below, provisions are made for the joined housing halves to be fixed oriented in the axial direction toward a source of the laser beam, but to be fixed oriented at least in an axial direction collinearly with a central longitudinal axis of a bundle of beams resulting because of the expansion of the laser beam, for the housing half facing away from the source of the laser beam (or facing away in the direction of the beam path) to be fixed in the axial direction, for example, by this housing half being clamped or being attached to a pin protruding into the interior of the housing halves in some sections, and the housing half facing toward the source of the laser beam (or facing toward the beam path) is fixed on the other housing half by means of a laser-transparent plate, especially by means of a glass plate. The axial fixing of the housing halves facing away from the source of the laser beam generally guarantees a position of the two housing halves to be connected at a defined position in the beam path. Fixing of the housing half facing toward the beam path on the other housing half by means of the laser-transparent plate guarantees a desired relative position of the two housing halves as well as a secure holding of the two housing halves relative to one another. Fixing by means of the laser-transparent plate guarantees that the laser beam is not interrupted. Such a laser-transparent plate, especially a glass plate, thus has a dual function. On the one hand, it lets the laser beam pass through. On the other hand, it holds the otherwise loose housing half on the fixed, for example, clamped housing half. The glass plate or a plate made of another laser-transparent material is in this case arranged such that a plane of the (glass) plate is at right angles to a central longitudinal axis of the laser beam expanded to a bundle of beams. This orientation brings about identical refraction conditions for the laser beam impacting the (glass) plate in a circular manner.

The flow tube being described here and below is especially considered to be a key component of a flow sensor. Thus, the innovation proposed here is also a flow sensor with a flow tube of the type described here and below. The flow tube and the flow sensor are especially considered for use in a medical device, for example, in a ventilator. Correspondingly, the innovation proposed here is also a medical device, especially a ventilator, with a flow tube or with a flow sensor as being described here and below.

An exemplary embodiment of the present invention is explained in more detail below based on the drawings. Subjects or elements corresponding to one another are provided with the same reference numbers in all figures.

The exemplary embodiment is not considered to be a limitation of the present invention. Rather, variations and modifications, especially such variants and combinations which the person skilled in the art can find in respect to accomplishing the object, for example, by a combination or variation of individual features contained in the general or special text of the description as well in the claims and/or in the drawings and lead to a new subject or to a new manufacturing process by combinable features, are possible within the framework of the present disclosure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
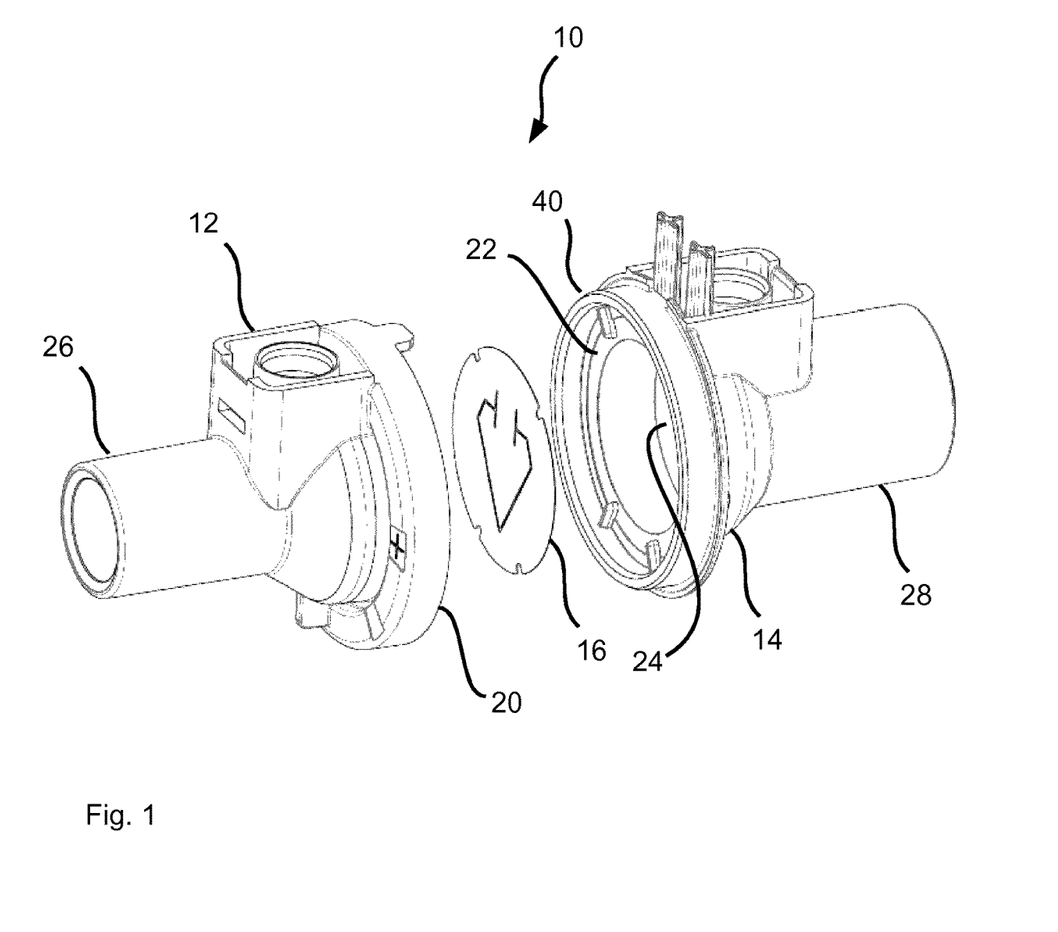
FIG. 1 is a perspective exploded view showing a flow tube with two housing halves forming a housing of the flow tube and with a diaphragm element between the housing halves.

Referring to the drawings, the view in FIG. 1 shows a flow tube 10 and a flow sensor formed with the flow tube 10 as a key component in a schematically simplified manner. The flow tube 10 comprises in a manner that is basically known per se two housing halves 12, 14, especially a first housing half 12 and a second housing half 14 as well as a diaphragm element 16 enclosed between the two housing halves 12, 14. Each housing half 12, 14 has a flange area and a connection surface 20, 22 as a surface of the flange area. The connection surfaces 20, 22 of the two housing halves 12, 14 together form a housing 12, 14 of the flow tube 10 and define a flow duct 24. In a manner basically known per se, the flow tube 10 is part of a pipeline 26, 28, especially of a pipeline 26, 28 functioning as a gas line, for example, of a gas line of a ventilator or of another medical device. The pipeline 26, 28 adjoins the flow duct 24 upstream and downstream of the flow tube 10 in the interior of the flow tube 10.

Figure 2:
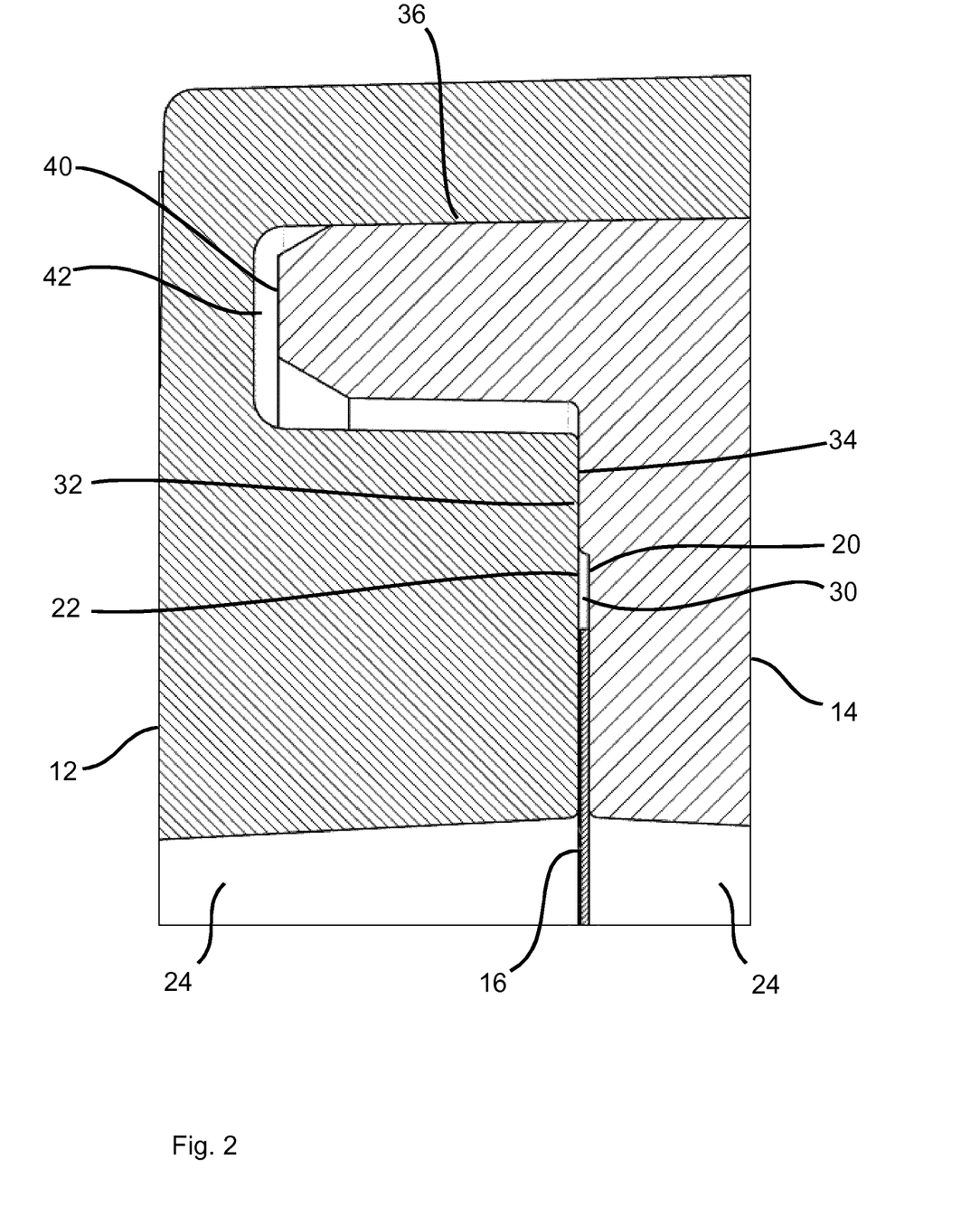
FIG. 2 is a sectional view through the housing halves.

The view in FIG. 2 shows a section through the flange areas of the two housing halves 12, 14 of the flow tube 10, which housing halves are combined (joined) with one another, with a sectional plane obliquely to the longitudinal axis of the flow tube 10. The surfaces of the flange area of the two housing halves 12, 14, which surfaces face one another and function as connection surfaces, define a mounting gap 30 for the diaphragm element 16 and enclose the diaphragm element 16 in this mounting gap 30 and by means of this mounting gap 30.

The view in FIG. 2 already shows a structuring of the connection surfaces 20, 22 according to a special embodiment of the innovation being proposed here. Generally and regardless of the special embodiment shown, provisions are made in case of the concrete flow tube 10 for the connection surfaces 20, 22 of the two housing halves 12, 14 combined with one another to abut against one another in some sections outside of the mounting gap 30 and for each connection surface 20, 22 to comprise an abutting surface section 32, 34 in this respect and for the housing halves 12, 14 to be combined with one another by connection in substance in at least one connection in substance area 36 outside of the mounting gap 30 and outside of the abutting surface sections 32, 34.

In the embodiment being shown, a contact surface between at least one projection 40 arising on the connection surface 20 of the first housing half 12 and at least one recess 42 in the connection surface 22 of the second housing half 14, which recess is intended for receiving the projection 40, functions as a connection in substance area 36. It should be expressly pointed out here that this special location of the connection in substance area 36 belongs to the special embodiment shown and that generally, on the one hand, the distance in space of the connection in substance area 36 from the abutting surface sections 32, 34 and, on the other hand, the distance in space of the connection in substance area 36 from the mounting gap 30 are of special importance.

Instead of at least one projection 40 and at least one recess 42 intended for receiving it, a plurality of such projections 40 and recesses 42, especially projections 40 and recesses 42 arranged along a circular line, preferably projections 40 and recesses 42, which are arranged equidistantly along such a circular line, i.e., to some extent pins (projections 40) on the connection surface 20 of the first housing half 12 and blind holes (recesses 42) in the connection surface 22 of the second housing half 14, come into consideration.

In the embodiment being shown, the recess 42 is an annular groove 42 extending in the connection surface 22 of the second housing half 14. The projection 40 is an annular spring 40 extending on the connection surface 20 of the first housing half 12. The annular groove 42 is intended for the receiving of the annular spring 40 and corresponding positions on the connection surfaces 20, 22 of the two housing halves 12, 14 guarantee the ability of the annular spring 40 to be inserted into the annular groove 42, wherein at least one lateral surface of the annular spring 40 comes into contact with a lateral surface of the annular groove 42, such that the lateral surfaces in question abut against one another. The lateral surfaces of the annular spring 40 and the annular groove 42 abutting against one another form the location of the connection in substance area 36 and in the embodiment shown the lateral surfaces of the annular spring 40 and the annular groove 42 abutting against one another in the radial direction are at a maximum distance from the mounting gap 30.

Starting from a central longitudinal axis of the housing halves 12, 14 (from a central longitudinal axis through the flow duct 24 defined by the housing halves 12, 14), the sequence of the mentioned structural details of the flow tube 10 is as follows: Mounting gap 30 ("inside"), abutting surface sections 32, 34 ("center"), projection 40/recess 42 or annular spring 40/annular groove 42 ("outside"). There is a distance between each of these structural details in the embodiment shown, i.e., the structural details following one another in the radial direction do not directly border on each other. The connection in substance of the two housing halves 12, 14 takes place in the area of the radially outermost structural details mentioned above, especially in the area of the radially outermost common contact surface of these structural details, i.e., of the radially outermost common contact surface of the projection 40 and the recess 42 or of the annular spring 40 and the annular groove 42.

When the two housing halves 12, 14 are joined, the connection surfaces 20, 22 come into contact in the area of the abutting surface sections 32, 34 and abut against one another there. This guarantees a defined width of the mounting gap 30. A connection in substance of the two housing halves 12, 14 in the connection in substance area 36, which is spaced apart from the mounting gap 30, on the one hand, and from the abutting surface sections 32, 34, on the other hand, guarantees the defined width of the mounting gap 30 even during and after establishing the connection in substance. This defined width of the mounting gap 30 guarantees either a defined clamping or a defined loose mounting of the diaphragm element 16 by the two housing halves 12, 14 and thus a defined and reproducible opening characteristic of the diaphragm element 16 in the flow duct 24 as a function of the flow direction in the flow duct 24. Consequently, the flow tube 10 can be used bidirectionally and thus comes into consideration for a bidirectional flow sensor.

Figure 3:
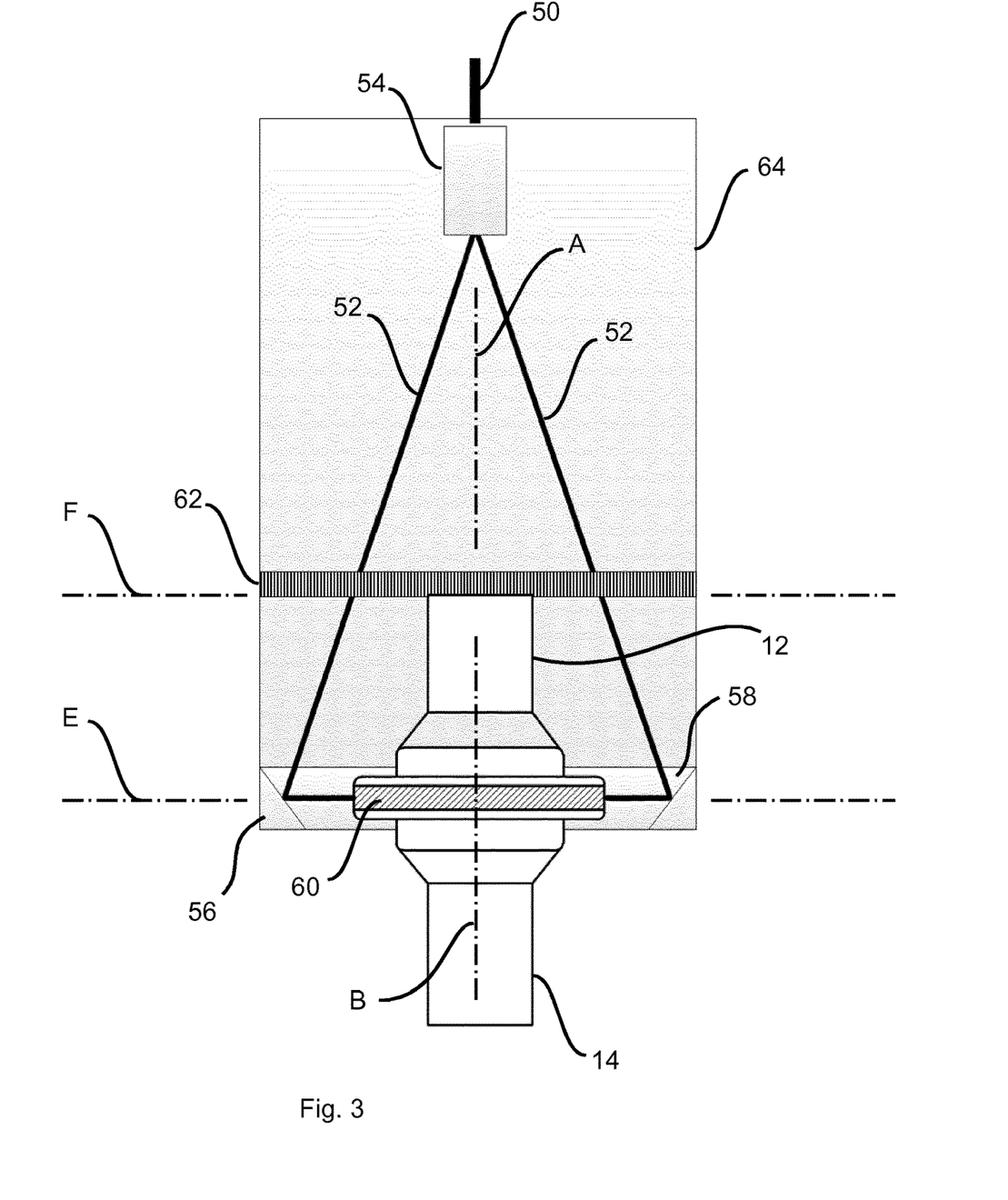
FIG. 3 is a schematic view of an arrangement for manufacturing a flow tube according to FIG. 1 and FIG. 2.

The view in FIG. 3 shows in a schematically simplified manner a top view of an arrangement for manufacturing a flow tube 10 according to FIG. 2, namely an arrangement for the connection in substance of the two housing halves 12, 14 of the flow tube 10.

The connection in substance of the two housing halves 12, 14 takes place by means of the joining process offered by laser welding by means of the arrangement according to FIG. 3. Correspondingly, the view in FIG. 3 shows a laser beam 50 and a bundle of beams 52 of the laser beam 50. The bundle of beams 52 is generated from the laser beam 50 by means of a first optical device 54, especially by means of a processing head 54 (axicon for ring generation and focusing lens) with collimation lens, which expands the laser beam 50 in a cone envelope. The bundle of beams 52 resulting as a result of the expansion is deflected onto the two housing halves 12, 14 by means of a second optical device 56, especially by means of a ring mirror 56 for simultaneous ring welding.

In case of a ring mirror 56, the reflecting surface 58 is for this purpose sloped against the plane of the ring mirror 56, for example, by 55°. By means of such a surface 58, the beams of the bundle of beams 52 impacting the ring mirror 56 are deflected in the direction towards the center of the ring mirror 56 and impact the two housing halves 12, 14 in the case of a pair of housing halves 12, 14 arranged and loosely joined there.

A ring mirror 56 as a second optical device 56 is oriented within the arrangement such that a plane E defined by the ring mirror 56 is at right angles to the (not expanded) laser beam 50 or is at right angles to a central longitudinal axis A of the cone envelope-shaped bundle of beams 52. The two initially loosely joined housing halves 12, 14 are located in the center of the ring mirror 56 in an orientation, in which a longitudinal axis B of the housing halves 12, 14 (a central longitudinal axis through the flow duct 24) coincides with the central longitudinal axis A of the cone envelope-shaped bundle of beams 52. The individual beams of the bundle of beams 52 impact the plane E of the ring mirror 56 as a function of the distance between the processing head 54 and the ring mirror 56 at an angle of less than 90° up to asymptotically close to 90°. The reflecting surface 58 of the ring mirror 56 is sloped against the plane of the ring mirror 56, for example, by an angle of 55° or an angle in the range of 55°. When for the sake of simpler conditions, it is assumed that the beams of the bundle of beams 52 impact the plane of the ring mirror 56 at a right angle, a deflection of the beams of the bundle of beams 52 precisely in the plane of the ring mirror 56 and in the direction towards the center of the ring mirror 56 takes place in case of a reflecting surface 58 of the ring mirror 56, which reflecting surface is sloped against the plane of the ring mirror 56 by an angle of 45°. In the case of beams of the bundle of beams 52 impacting the plane of the ring mirror 56 at an angle of less 90° and in case of a reflecting surface 58 sloped against the plane of the ring mirror 56 at an angle of 45°, the beams falling on the ring mirror 56 are not accurately deflected into the plane of the ring mirror 56. A deflection accurately into the plane of the ring mirror 56 can be achieved by a corresponding adaptation of the slope of the reflecting surface 58 of the ring mirror 56, for example, a slope of 55°. This is optionally possible, but not absolutely necessary. It is important that the two housing halves 12, 14 are placed in the center of the ring mirror 56 such that the connection in substance area 36 is located in the beam path of the bundle of beams 52 deflected by the surface 58 of the ring mirror 56, as this is shown in the view in FIG. 3. The individual beams of the bundle of beams 52 then impact one of the housing halves 12, 14 along the perimeter thereof. The connection in substance area 36 is located in the interior of the initially loosely joined housing halves 12, 14. The housing half 14 located on the outside (in the direction towards the ring mirror 56) with the recess 42, especially with a recess 42 in the form of an annular groove 42, shadows the connection in substance area 36 against the beam path. So that the laser beams can reach the connection in substance area 36 (FIG. 2), the shadowing housing half 12 is made of a transparent material, especially of a laser-transparent plastic and thus has a laser-transparent configuration or has a laser-transparent configuration at least in the area of the beam path. The other housing half 14 absorbs the energy of the laser beam 50 and is made of a corresponding material, especially of a corresponding plastic. Which of the two housing halves 12, 14 is the shadowing housing half 12, 14 which is located on the outside and consequently has an entirely or partially laser-transparent configuration depends on the configuration of the housing halves 12, 14 of the flow tube 10. Because of the absorption of the laser energy by the housing half 14, which is not laser transparent or is at least not laser transparent in the connection in substance area 36, a circular weld seam is formed in the connection in substance area 36. In this case, the housing half 14, which is not laser transparent or at least not laser transparent in the connection in substance area 36 is plasticized in the connection in substance area 36 by the energy of the laser beam 50. Due to heat conduction, the material of the other housing half 12 is also plasticized in the connection in substance area 36. A connection in substance and positive-locking connection as well as gastight connection between the housing halves 12, 14 is thus formed in the connection in substance area 36.

According to FIG. 3, in a preferred embodiment of the arrangement, a laser-transparent, plane-parallel plate 62, especially a plane-parallel glass plate, belongs to the arrangement intended for the manufacture of a flow tube 10, namely for the connection in substance of the two housing halves 12, 14. Such a laser-transparent plate 62 fixes the two housing halves 12, 14 relative to one another and holds the two at first loosely joined housing halves 12, 14 for connection in substance during the connection in substance. For this purpose, the housing half 14 facing away in the beam path (the housing half 14 at the furthest distance from the source of the laser beam 50 along the beam path) is fixed, for example, clamped or placed onto a pin protruding into the interior of the housing half 14 at the free end of the housing half 14 or is inserted into a sleeve extending around the free end of the housing half 14. At any rate, this housing half 14, which is designated below briefly as housing half 14 facing away in the beam path, is fixed in relation to the ring mirror 56 in the axial and radial directions, wherein the fixing in the radial direction means that a central longitudinal axis B of this housing half 14 coincides with a central longitudinal axis A of the bundle of beams 52 impacting the ring mirror 56 (the housing half 14 is located in the radial direction in the center of the ring mirror 56). The other housing half 12, which is designated below as the housing half 12 facing toward the beam path, can at first be loosely placed onto such a fixed housing half 14 facing away in the beam path. Here, the projection 40 and the recess 42, especially the annular spring 40 and the annular groove 42, are meshed with one another. The laser-transparent plate 62 is provided for fixing this housing half 12 facing toward the beam path. This laser-transparent plate 62 is in contact with the housing half 12 facing toward the beam path at the free end thereof. The central longitudinal axes B of the two housing halves 12, 14 are collinear and collinear with the central longitudinal axis A of the bundle of beams 52 (thus also collinear with the laser beam 50). The central longitudinal axes A, B are at right angles to a plane E of the ring mirror 56. The boundary line of the free end of the housing half 12 facing toward the beam path is located in a plane parallel to the plane E of the ring mirror 56. A plane F of the laser-transparent plate 62 lying on or in contact with the boundary line of the free end of the housing half 12 facing toward the beam path is thus likewise parallel to the plane E of the ring mirror 56 and a central longitudinal axis A of the bundle of beams 52 is also at right angles to the plane F of the laser-transparent plate 62. All beams of the bundle of beams 52 experience the same refraction due to the laser-transparent plate 62 because of the homogeneous material and because of the arrangement in the bundle of beams 52. The laser-transparent plate 62 thus functions as an advantageous device for fixing the housing half 12 (the housing half 12 facing toward the beam path) at first loosely combined with the other housing half 14 (the housing half 14 facing away in the beam path).

The laser-transparent plate 62 is displaceable in a movable manner obliquely to its plane F for the purpose of such a fixing optionally in a housing 64 of the arrangement. For welding together two housing halves 12, 14, the housing halves 12, 14 are placed in the area of the ring mirror 56 in the manner described above. Optionally, at least the housing half 14 facing away in the beam path is in this case likewise held by means of the housing 64 or this housing half 14 is held by means of a fixing device (not shown), wherein the housing 64 is fixed relative to the fixing device. Before the housing halves 12, 14 are placed in the area of the ring mirror 56, the laser-transparent plate 62 is thus displaced until the housing half 12 facing toward the beam path is fixed by means of the laser-transparent plate 62. A guide comprised by the housing 64, which allows the translatory moving operations described, is provided for moving the laser-transparent plate 62.

Finally, individual prominent aspects of the description submitted here can be summarized briefly as follows: Proposed are a flow tube 10 and a process for manufacturing a concrete flow tube 10. The flow tube 10 comprises an at least two-part housing with a first and a second housing half 12, 14, wherein each housing half 12, 14 has a connection surface 20, 22 intended for the combination with the respective other housing half 12, 14. The connection surfaces 20, 22 of the two housing halves 12, 14 combined with one another enclose a mounting gap 30 for a diaphragm element 16. The diaphragm element 16 functions as a flow body in a flow duct 24 defined by the housing 12, 14. The connection surfaces 20, 22 of the two housing halves 12, 14 combined with one another abut against one another in some sections outside of the mounting gap 30 (at a distance in space from the mounting gap 30). In this respect, each connection surface 20, 22 comprises an abutting surface section 32, 34 located at a spaced location from the mounting gap 30. The two housing halves 12, 14 are combined with one another by connection in substance, namely by laser welding, outside of the mounting gap 30 (at a distance in space from the mounting gap 30) and outside of the abutting surface sections 32, 34 (at a distance in space from the abutting surface sections 32, 34).

While specific embodiments of the invention have been shown and described in detail to illustrate the application of the principles of the invention, it will be understood that the invention may be embodied otherwise without departing from such principles.

The invention claimed is:

1. A flow tube with a housing comprising at least a first housing half and a second housing half,
   wherein each housing half has a connection surface which is configured to combine with the respective other housing half,
   wherein the connection surfaces of the two housing halves combined with one another enclose a mounting gap for a diaphragm element functioning as a flow body in a flow duct defined by the housing,
   wherein the two housing halves are connected with each other in a material bonded manner in an area for material bonding,
   wherein each connection surface comprises an abutting surface section located at a spaced location from the mounting gap,
   wherein the two housing halves are combined with each other in a material bonded manner outside of the mounting gap and outside of the abutting surface sections,
   wherein at least one of the two housing halves is laser transparent in the area for material bonding, and
   wherein the two housing halves are connected with each other in a material bonded manner in the area for material bonding by laser welding.

2. The flow tube in accordance with claim 1,
   wherein one of the housing halves has at least one connection surface projection and the other housing half has at least one connection surface recess configured to receive the projection, and
   wherein the housing halves are combined with one another in the material bonded manner by the projection and the recess by surfaces or surface sections of the projection and of the recess coming into contact with one another during the joining of the housing halves forming a material bonded connection.

3. The flow tube in accordance with claim 2,
   wherein the mounting gap, the abutting surface sections as well as the projection and the recess are arranged on the connection surfaces in a radial direction such that the mounting gap is located in front of the abutting surface sections in relation to the abutting surface sections and the projection and the recess are located behind the abutting surface sections in relation to the abutting surface sections.

4. The flow tube in accordance with claim 2,
   wherein the projection and the recess are connected to one another in a material-bonded manner in the area of a radially outermost common contact surface.

5. The flow tube in accordance with claim 2, wherein the at least one projection is a radially extending projection and the at least one recess is a radially extending recess.

6. The flow tube in accordance with claim 1,
   wherein the two housing halves are connected in the material bonded manner a laser beam expanded onto a cone envelope active along an entire perimeter thereof.

7. The flow sensor in accordance with claim 1, wherein the two housing halves are connected in the material bond manner by a laser beam expanded onto a cone envelope active along an entire perimeter thereof.

8. A flow sensor comprising a flow tube, the flow tube comprising:
   a first housing portion with a first portion connection surface; and
   a second housing portion with a second housing portion connection surface configured to combine with the first portion connection surface and to enclose a mounting gap for a diaphragm element as a flow body in a flow duct defined by the housing, wherein the first portion connection surface comprises a first abutting surface and the second portion connection surface comprises a second abutting surface section, the first housing portion and the second housing portion being connected with each other in a material bonded manner in an area for material bonding, each of the first abutting surface section and the second abutting surface section being located at a spaced location from the mounting gap, wherein the first housing portion and the second housing portion are combined with each other in the material bonded manner outside of the mounting gap and outside of the first abutting surface section and of the second abutting surface section, wherein at least one of the first housing portion and the second housing portion is laser transparent in the area for material bonding and the first housing portion and the second housing portion are connected with each other in the material bonded manner in the area for material bonding by laser welding.

9. The flow sensor according to claim 8 in combination with a medical device part to provide a medical device with the at least one flow tube.

10. The flow sensor in accordance with claim 8,
wherein one of the housing halves has at least one connection surface projection and the other housing half has at least one connection surface configured to receive the projection, and
wherein the housing halves are combined with one another in the material bonded manner by the projection and the recess by surfaces or surface sections of the projection and of the recess coming into contact with one another during the joining of the housing halves forming the connection in substance area.

11. The flow sensor in accordance with claim 10, wherein the mounting gap, the abutting surface sections as well as the projection and the recess are arranged on the connection surfaces in a radial direction such that the mounting gap is located in front of the abutting surface sections in relation to the abutting surface sections and the projection and the recess are located behind the abutting surface sections in relation to the abutting surface sections.

12. The flow sensor in accordance with claim 10, wherein the projection and the recess are connected to one another by material bond connection in the area of a radially outermost common contact surface.

13. The flow sensor in accordance with claim 10, wherein the at least one projection is a radially extending projection and the at least one recess is a radially extending recess.

14. The flow sensor in accordance with claim 8, wherein the first portion connection surface and the second housing portion connection surface are perpendicular to a longitudinal axis of the first housing half, the first housing half having a first housing half surface, the second housing half having a second housing half surface, the first housing half surface engaging the second housing half surface in the area for material bonding, the first housing half surface and the second housing half surface being parallel to the longitudinal axis of the first housing half, the first portion connection surface and the second housing portion connection surface being located radially beyond the mounting gap with respect to the longitudinal axis of the first housing half, the first housing half surface and the second housing half surface being located radially beyond the mounting gap, the first portion connection surface and the second housing portion connection surface with respect to the longitudinal axis of the first housing half.

15. A process for manufacturing a flow tube, the flow tube comprising a first housing half with a first portion connection surface and a second housing half with a second housing portion connection surface configured to combine with the first portion connection surface and to enclose a mounting gap for a diaphragm element as a flow body in a flow duct defined by the housing, wherein the first portion connection surface comprises a first abutting surface section and the second housing portion connection surface comprises a second abutting surface section, the first abutting surface section and the second abutting surface section being located at a spaced location from the mounting gap, and at least one of the first housing half and the second housing half being laser transparent in an area for material bonding, wherein the process comprises the following steps:
joining the two housing halves such that the diaphragm element is enclosed by the two housing halves in the mounting gap and the two housing halves abut against one another outside of the mounting gap in the area of the first abutting surface section and the second abutting surface section; and
combining the housing halves with each other in a material bonded manner outside of the mounting gap and outside of the first abutting surface section and of the second abutting surface section by laser welding, wherein the two housing halves are connected with each other in the material bonded manner in the area for material bonding.

16. The process in accordance with claim 15,
wherein the process step of joining the two housing halves comprises the partial step of the insertion of the projection into the recess and correspondingly the joining of the two housing halves takes place such that
the diaphragm element is enclosed by the two housing halves in the mounting gap, and
the two housing halves abut against one another outside of the mounting gap in the area of the abutting surface sections and the projection meshes with the recess.

17. The process in accordance with claim 16, wherein the two housing halves are connected in the material bonded manner to one another by the projection meshing with the recess being connected to the recess by laser welding.

18. The process in accordance with claim 17,
wherein for the laser welding a laser beam is expanded in a cone envelope by a first optical device and is deflected by a second optical device in direction of a connection in substance area enclosed by the two loosely joined housing halves, and
wherein the radially extending projection is connected in a material bonded manner by laser welding to the radially extending recess by the laser beam at the same time along an entire perimeter thereof.

19. The process in accordance with claim 18,
wherein the joined housing halves are fixed in an axial direction aligned collinearly with a central longitudinal axis of a bundle of beams with an expansion of the laser beam,
wherein the housing half facing away from a source of the laser beam in the beam path is fixed in the axial direction, and the housing half facing towards the source of the laser beam in the beam path is fixed by a laser-transparent plate on the other housing half, wherein a plane of the laser-transparent plate is at right angles to a central longitudinal axis of the two housing halves, which central longitudinal axis runs through the source of the laser beam.

20. The process in accordance with claim 15, wherein the laser beam penetrates the laser-transparent housing half during the laser welding and the other housing half absorbs the energy of the laser beam.

\* \* \* \* \*